United States Patent
Kakumani et al.

(10) Patent No.: US 6,681,382 B1
(45) Date of Patent: Jan. 20, 2004

(54) METHOD AND SYSTEM FOR USING VIRTUAL LABELS IN A SOFTWARE CONFIGURATION MANAGEMENT SYSTEM

(75) Inventors: Badari N. Kakumani, San Jose, CA (US); Erik E. Brady, Santa Cruz, CA (US); Karl B. Klashinsky, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 505 days.

(21) Appl. No.: 09/664,987

(22) Filed: Sep. 18, 2000

(51) Int. Cl.$^7$ ................................................. G06F 9/44
(52) U.S. Cl. ..................... 717/122; 717/121; 717/108; 717/113; 707/103 R; 707/203; 707/511
(58) Field of Search ................................. 717/122, 121, 717/113, 170, 174, 120, 108; 707/511, 203, 103 Y, 103 Z, 1, 204, 103 R; 712/16

(56) References Cited

U.S. PATENT DOCUMENTS

| | | | | | |
|---|---|---|---|---|---|
| 5,403,639 | A | * | 4/1995 | Belsan et al. | 707/204 |
| 5,574,898 | A | * | 11/1996 | Leblang et al. | 707/1 |
| 5,636,371 | A | * | 6/1997 | Yu | 703/26 |
| 5,649,200 | A | * | 7/1997 | Leblang et al. | 717/122 |
| 5,701,472 | A | * | 12/1997 | Koerber et al. | 707/203 |
| 5,706,431 | A | * | 1/1998 | Otto | 709/221 |
| 5,754,841 | A | * | 5/1998 | Carino, Jr. | 707/3 |
| 5,806,062 | A | * | 9/1998 | Chen et al. | 707/4 |
| 5,878,432 | A | * | 3/1999 | Misheski et al. | 707/103 R |
| 5,915,123 | A | * | 6/1999 | Mirsky et al. | 712/16 |
| 6,047,280 | A | * | 4/2000 | Ashby et al. | 707/2 |
| 6,112,024 | A | * | 8/2000 | Almond et al. | 717/122 |
| 6,182,286 | B1 | * | 1/2001 | Sigal et al. | 717/122 |
| 6,209,128 | B1 | * | 3/2001 | Gerard et al. | 717/108 |
| 6,223,343 | B1 | * | 4/2001 | Hopewood et al. | 717/174 |
| 6,256,773 | B1 | * | 7/2001 | Bowman-Amuah | 717/121 |
| 6,298,476 | B1 | * | 10/2001 | Misheski et al. | 717/101 |
| 6,367,077 | B1 | * | 4/2002 | Brodersen et al. | 717/170 |
| 6,385,768 | B1 | * | 5/2002 | Ziebell | 717/121 |
| 6,449,624 | B1 | * | 9/2002 | Hammack et al. | 707/203 |
| 6,519,571 | B1 | * | 2/2003 | Guheen et al. | 705/14 |
| 6,539,396 | B1 | * | 3/2003 | Bowman-Amuah | 707/101 |

OTHER PUBLICATIONS

Title: Object identity, Authors: Khoshafian et al, ACM, 1986.*

Title: Versioning Model of Image Objects for Easy Development of Image Database Applications, author: Kawashima et al, IEEE, 1996.*

Title: Concepts in configuration management systems, author: Dart, ACM, May 1991.*

Title: VerSE: Towards Hypertext Versioning Styles, author: Haake et al, ACM, 1996.*

(List continued on next page.)

Primary Examiner—Chameli C. Das
(74) Attorney, Agent, or Firm—Hickman Palermo Truong & Becker LLP

(57) ABSTRACT

The present invention provides a solution to the needs described in the present application through a system and method of using Virtual Labels in conjunction with an existing software configuration management system. The present invention minimizes the identification or meta-data which needs to be written to a source database or source repository whenever a label for a new version of source code needs to be created thereby minimizing the file storage requirements and the network bandwidth for the transmission of replications of the label. The virtual label system makes use of attribute data connected to a label object to record identification meta-data associated with a particular snap-shot of the source code, whereby the attribute data is subsequently used for program builds/releases/new branch development without the need to have the meta-data recorded in every component source file.

31 Claims, 8 Drawing Sheets

OTHER PUBLICATIONS

TITLE: Developing a User Information Architecture for Rational's ClearCase Product Family Documentation Set, author: Hunter et al, ACM, 1999.*

TITLE: Version models for software configuration management, Authors: Reidar Conradi et al, ACM, 1998.*

TITLE: A Hypermedia Version Control Framework, Hicks et al, ACM, Apr., 1998.*

TITLE: A Process–Oriented Version and Configuration Management Model for Communications Software, author: Ochoudho et al, ACM, 1991.*

* cited by examiner

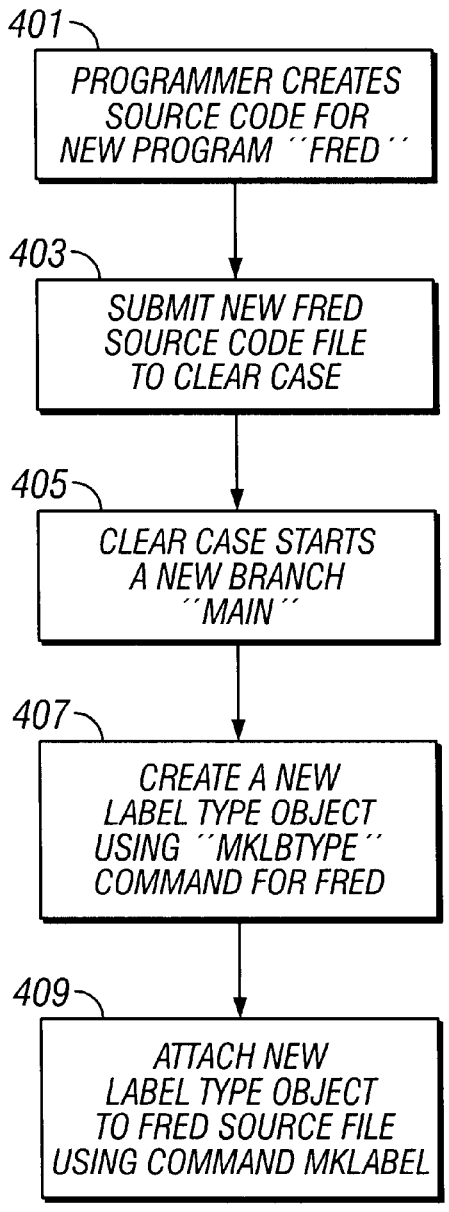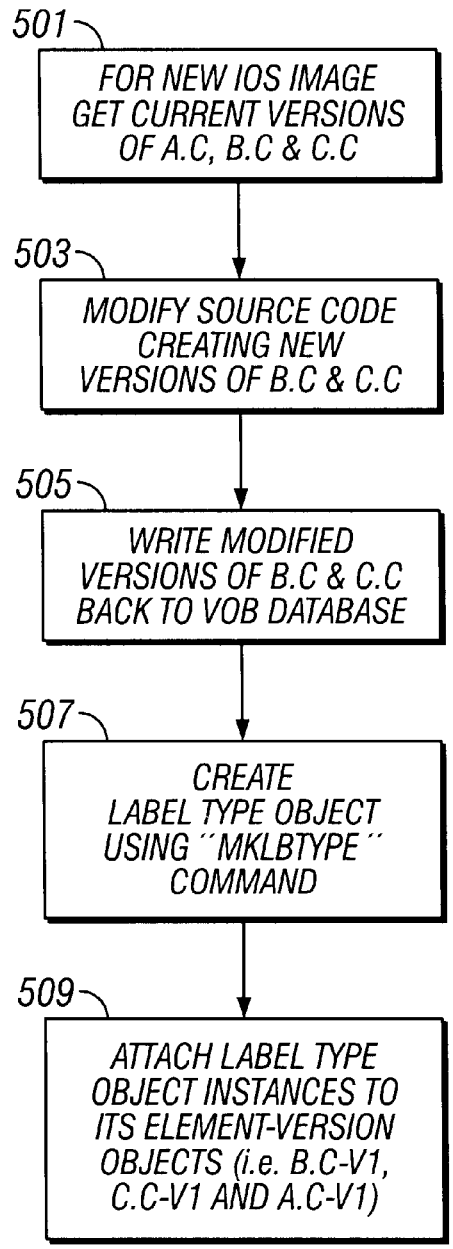
FIG. 4
(Prior Art)
FIG. 5
(Prior Art)

METHOD AND SYSTEM FOR USING VIRTUAL LABELS IN A SOFTWARE CONFIGURATION MANAGEMENT SYSTEM

A portion of the disclosure of this patent document contains material, which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

TECHNICAL FIELD

This invention relates to the field of source code control for computer software development. More particularly, the present invention relates to a method and system for using virtual labels in a software configuration management system.

BACKGROUND ART

Typically in a large software development project, many programmers or programming groups work in conjunction with one another to develop a single piece of software. Moreover, in today's distributed environment, using local area networks (LAN) as well as wide area networks (WAN), these various programmers and programming groups may be spread around the world.

In the past source code management software has been developed to provide an efficient means for coordinating and documenting the programming activities of such a development group. Early versions of these systems were the Source Code Control System (SCCS), and the Revision Control System (RCS). Other systems are described in detail in U.S. Pat. No. 5,481,722 issued Jan. 2, 1996 titled "Method and Apparatus for Merging Change Control Delta Structure Files of a Source Module from a Parent and a Child Development Environment"; in U.S. Pat. No. 4,912,637 issued Mar. 27, 1990 titled "Version Management Tool"; and in U.S. Pat. No. 4,558,413 issued Dec. 10, 1985 titled "Software Version Management System." The systems described in these patents focused primarily on the version control problem in the context of relatively small programs and system usage in relatively small local development groups.

In today's hectic technology environment, software developers rush to get original product to market, followed by the inevitable "bug-fix" revisions, new feature releases, and extensive upgrades in a never ending cycle. Extensive use of Object Oriented Programming (OOP) techniques has added several levels of complexity to the configuration management task. Some large hardware companies, whose products' sales are dependent on related software supporting new hardware features, add an additional pressure on software developers to rapidly modify existing software and produce new feature releases. Such shorter release cycles increase the need for development groups to engage in parallel development. However dividing project efforts among multiple developers or teams can lead to problems with software integration, reoccurring bugs, and lost changes. The requirement to maintain control of the source code in all of these releases amid continuing development is even more critical than in the past. In addition, such an environment of complex software, multiple platforms, globally dispersed development groups has required software configuration management systems which have process management functions embedded within the software configuration management tools. Process management functions are needed which include configuration control, version control, and also control of the procedures for sophisticated build/release functions, web object management functions and development and deployment functions.

Such requirements have led a number of system vendors such as; IBM™. Computer Associates Inc.™, Microsoft™, and others, to develop comprehensive Version Management and build/release systems for software configuration management. One system which is widely popular today is the ClearCase™ system by Rational Software Corp.™ This ClearCase™ system is used in the preferred embodiment of the present invention and is described in more detail below.

Any of these version control systems operate on the basic principle of: centrally storing the source code for a program along with descriptive information (in some cases called meta-data) containing a file name or label, date and time stamp information, version number, owner/developer, maintenance engineer, etc.; recording whenever someone checks out a copy of a given file; writing another completely new file whenever the file is checked back in to the repository, along with perhaps the delta changes between the checked-in version and the previous version. In some cases only the delta changes may be recorded in the new file. This scheme obviously leads to a rapid growth in the volume of data maintained in the configuration management system.

In many cases, as in the ClearCase™ system used in the preferred embodiment, "release labels" are used as mnemonic identifiers (for example REL3.1.5) which can be attached to any version of a source code element. Attaching such labels is sometimes referred to as "labeling" or "creating a configuration snapshot." In an object oriented system such as the ClearCase™ system, the labeling process involves creating a label type object and then creating an instance of the label type for the version object in question. This involves resources for creating the label objects as well as memory for storing the connections. In the case where copies of this source file reproduction system are replicated in a number of other development sites around the world, each new version written to any of these systems is immediately transmitted to all of the other global development sites. Thus the additional storage requirement for the new version and its labels are multiplied by the number of development sites maintained. Additionally the network traffic generated by the transmission of the new version to all of the development sites exacerbates already loaded networks. Finally, the design of many of these existing configuration control systems do have upper limits on the file sizes they are capable of handling, and while these limits are large, many users of these systems in today's rapid release environment can approach these limits.

The technical problem addressed by the current invention relates to this issue of hardware resources needed for creating a label for each new release of a software system as well as the transmission load associated with the replication of the new label. There is a need to minimize the data written with each new release of a software system in order to conserve the available file storage resources as well as to minimize the data transmitted on the network attendant to a new release.

SUMMARY OF THE INVENTION

The present invention provides a solution to the needs described above through a system and method of using Virtual Labels in conjunction with an existing software configuration management system. The present invention minimizes the identification or meta-data which needs to be written to a source database or source repository whenever a label for a new snapshot configuration of source code needs to be created thereby minimizing the source database storage requirements and the network bandwidth for the transmission of distributed replications of the label. The virtual label system makes use of attribute data connected to a label object to record identification meta-data associated with a particular snapshot of the source code, whereby the attribute data is subsequently used for program builds/releases/new branch development without the need to have meta-data recorded in every component source file.

A system is disclosed for using virtual labels with an existing software configuration management mechanism, to generate a build tree for a desired program configuration. The system further contains the ability to generate a specification for a particular configuration made up of a multiplicity of individual source code file objects by using attributes connected to label objects instead of source code file objects.

Also disclosed is a method for using attributes related to a source code file label object to create a virtual label of a combination of source code files.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which:

FIG. 4 illustrates a block diagram of the prior art process of initial program file creation in the ClearCase™ software configuration management system.

FIG. 5 illustrates a block diagram of the prior art process for new version creation with new labels in the ClearCase™ software configuration management system.

DETAILED DESCRIPTION OF THE INVENTION

Capturing and storing a snapshot configuration is a basic requirement of any Software Configuration Management (SCM) system. CVS and RCS use tags and Rational™ ClearCase™ uses labels for creating snapshots. These snapshot creation methods are resource intensive. A system and method of using Virtual Labels, in conjunction with an existing Rational™ ClearCase™ SCM system, that requires much fewer resources for such snapshots, are disclosed. The present invention minimizes the identification or meta-data which needs to be written to a source code repository whenever a label needs to be created for a configuration of a piece of source code thereby minimizing the storage requirements, the network bandwidth and processing time for the transmission of replications of the modified source records to other developer sites. The virtual label system makes use of attribute data connected to a label object to identify "element version" pairs associated with the label, whereby the attribute data is subsequently used for program builds/releases/new branch development without the need to have the meta-data associated with every component source file. In the following description for purposes of explanation, specific data and configurations are set forth in order to provide a thorough understanding of the present invention. In the presently preferred embodiment the Virtual Label system is described in terms of a client system using the invention in connection with a Rational™ ClearCase™ configuration management system. However, it will be apparent to one skilled in these arts that the present invention may be practiced without the specific details, in various software configuration management applications. In other instances, well-known systems and protocols are shown and described in diagrammatical or block diagram form in order not to obscure the present invention unnecessarily.

ADDITIONAL BACKGROUND INFORMATION

The concepts of Object Oriented Programming (OOP) are well known in the programming and computer utilization arts. Those skilled in these arts will recognize the use of objects, object types, creation and instantiation of objects and related ways of using, calling and manipulating them.

A preferred embodiment of the invention utilizes object oriented procedures for managing label objects containing snapshots of source code (files and directories) for use by development programmers in a Software Configuration Management (SCM) system

OPERATING ENVIRONMENT

Figure 1:
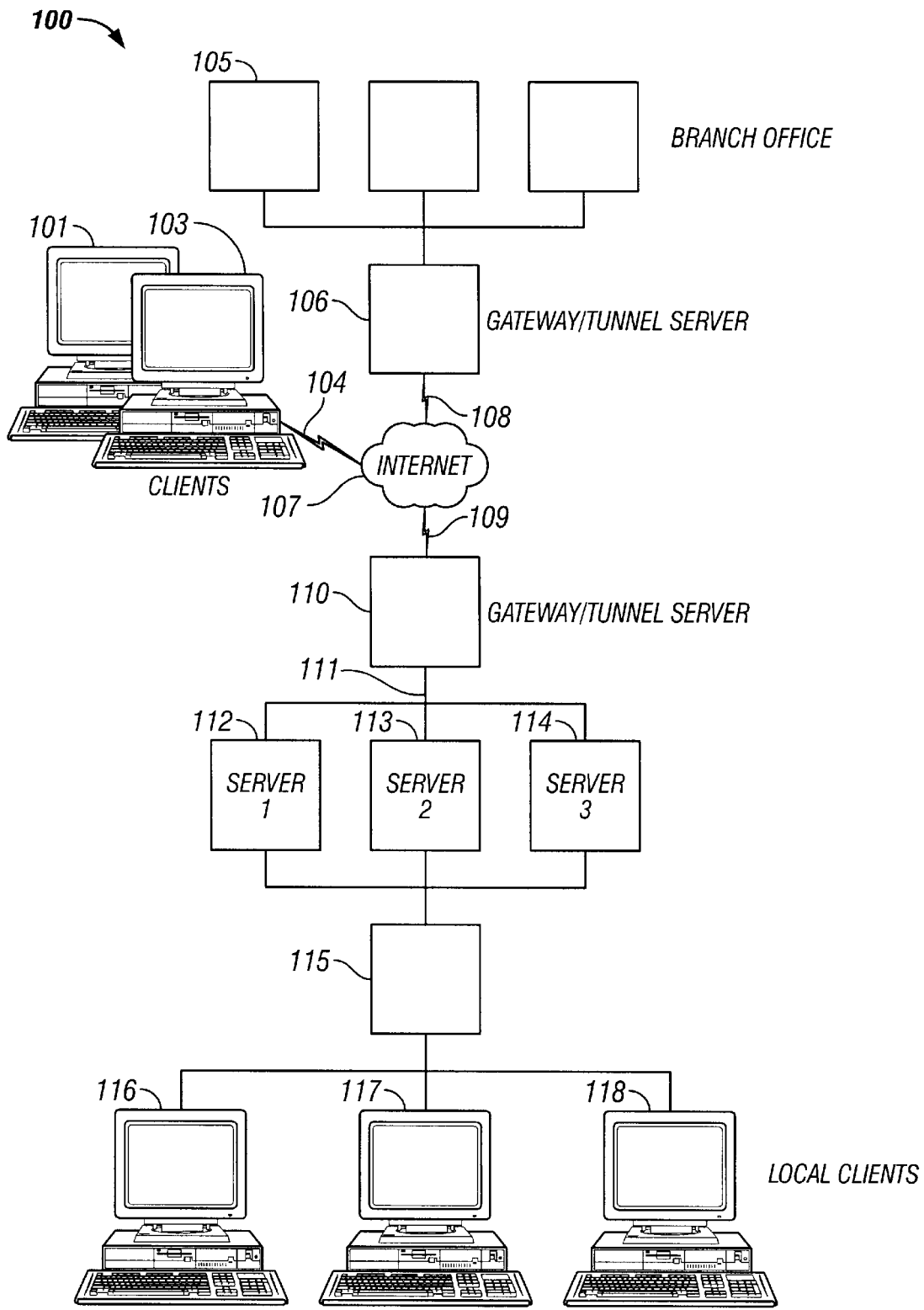
FIG. 1 illustrates a typical Internet network configuration.
Figure 2:
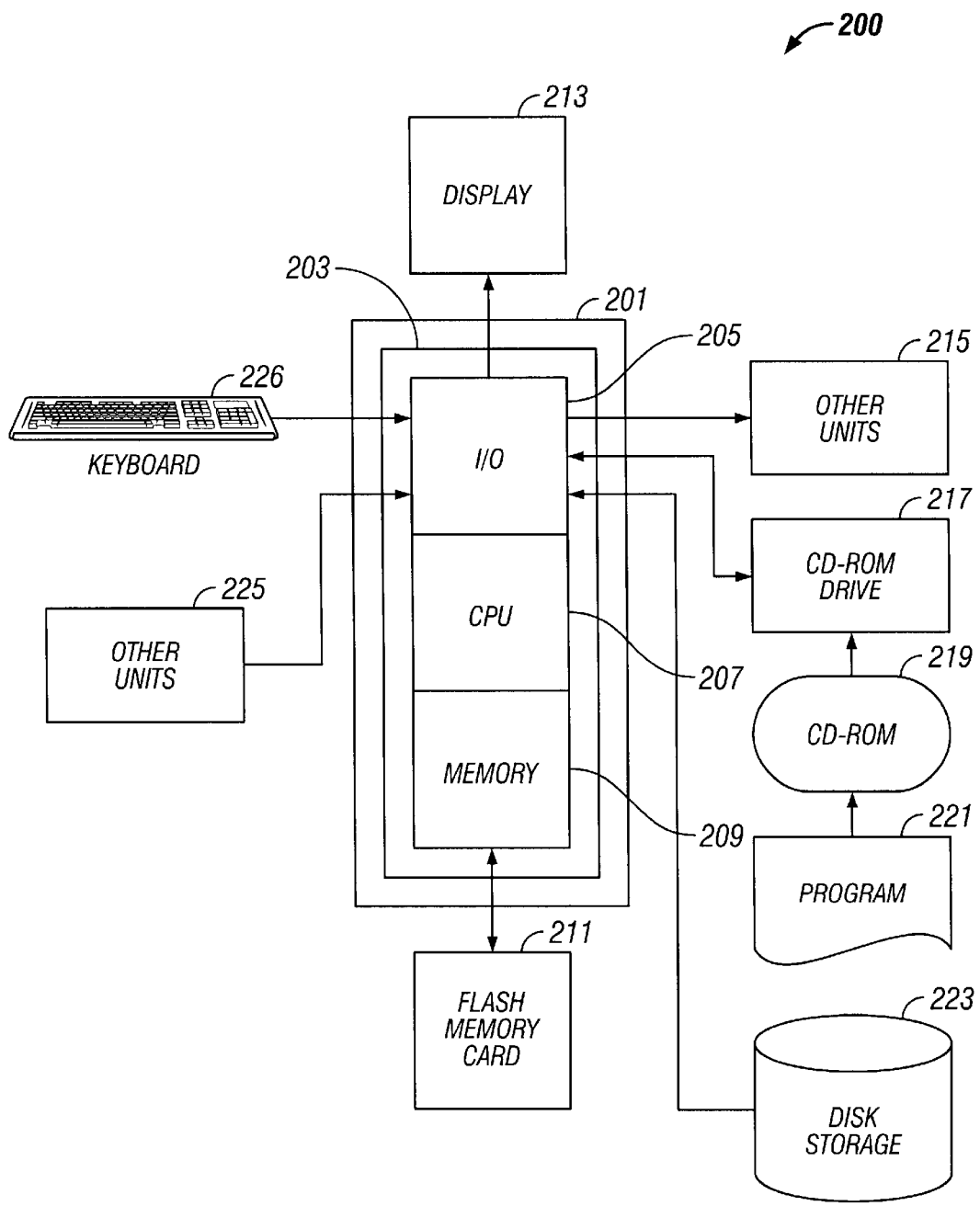
FIG. 2 illustrates a representative general-purpose computer client configuration.

The environment in which the present invention is used encompasses the development of operating system program images for network switches and routers manufactured and sold by Cisco Systems Inc.™, the assignee of the present invention. These switches and routers are used in the general distributed computing scene which includes generally local area networks with hubs, routers, gateways, tunnel-servers, applications servers, etc. connected to other clients and other networks via the Internet. Some of the elements of a typical internet network configuration are shown in FIG. 1, wherein a number of client machines 105 possibly in a branch office of an enterprise, are shown connected to a Gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a home office via an ISP connection 109 to a gateway/tunnel-server 110 which is connected 111 to various enterprise application servers 112, 113, 114 which could be connected through another hub/router 115 to various local clients 116, 117, 118. A proprietary version of such a network system may be used to connect distributed program development teams, wherein program source code files and data are made available to these various globally dispersed development programming teams for use in new program development An embodiment of the Virtual Label system can operate on a general-purpose computer unit, which typically includes generally the elements shown in FIG. 2. The general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general-purpose computer units 225, 215, a disk storage unit 223 and a CD-ROM drive unit 217. The CD-ROM drive unit 217 can read a CD-ROM medium 219, which typically contains programs, 221 and other data. Logic circuits or other components of these programmed computers will perform series of specifically identified operations dictated by computer programs as described more fully below.

A preferred embodiment of the present invention will be described in terms of a UNIX workstation, typically a Sun Microsystems Inc.™ SPARC workstation, connected to a Sun Enterprise™ E4000™ server having 4 UltraSPARC™ CPUs and 8 Gigabyte of memory with a mirrored 36 Gigabyte disk partition acting as a VOB server, and a Sun Enterprise™ E6000™ server having 12 UltraSPARC™ CPUs and 3 Gigabyte of memory acting as a "View server." Tools used for the virtual label system are typically written in the PERL language.

The present invention provides all the necessary tools and libraries to generate a build/release image of a desired configuration, and, is described in more detail below with regards to a preferred embodiment.

In the preferred embodiment, the basic multi-site software configuration management system used with the invention is the ClearCase™ system distributed by Rational Software Corporation™ of Cupertino, Calif. Detailed information describing the ClearCase™ system is contained in the Clear-Case™ Concepts Manual (document number 4000-002-B, April 1994, ATRIA Software Inc., Natick, Mass.) which is hereby incorporated fully herein by reference.

Basic system related definitions which are not defined elsewhere in this document and which are used herein include the following:

Virtual label=As opposed to physical labels, virtual-labels do not place label instances on all file/dir-versions. The virtual-labels have a ClearCase™ label type created. Label instances are attached only to cherry-picked element version items, if needed. The ClearCase™ label types that represent virtual label will have attributes attached to them. These attributes make it possible to construct a configuration-specification (hereinafter referred to as "config-spec") that can be used to access all the file/dir-versions belonging to the label. Each virtual label minimally has the following attributes associated with it:

freezetime=The REF_TIME of the last changeset commit on the branch that this label will encompass. Note that each changeset commit records the REF_TIME to be the current time after all the elements (files/ directories) corresponding to the commit are checked in.

REF_LABEL Label on the parent branch that the currentbranch is based on when this virtual-label was laid. Note that the REF_LABEL can be a virtual-label.

BRANCH The name of the branch to which this virtual label belongs.

type_object=A type object is a prototype for one or more data items stored in a VOB database. A user creates the data items by entering commands that create instances of the type object. This is described in more detail below.

label=a 'label instance'; that is, an association of the label type object with an element version.

physical label=Physical label is a term used for a label object whose instances are attached to each element version that belongs to the label.

ClearCase™ label type=A definition of a label type object in ClearCase.™ Once the definition exists in ClearCase™, ClearCase™ allows you to place instances of the label type object on element versions. See type_object above.

attributes=An attribute is a name=value pair. Attributes can be attached to most kinds of objects. They can take many kinds of values, including integers, strings, dates, and others. Powerful query commands in the ClearCase™ system enable users to find all versions annotated with a specific attribute. label attribute=The attributes are the characteristics of the label. These attributes make it possible to generate the config-spec of the view that created the label.

view=A virtual filesystem created by ClearCase™ software that is driven by a config-spec. This virtual filesystem would select configuration which displays exactly one version of an element as dictated by the config-spec.

config spec=configuration specification. The config spec is part of the ClearCase™ view. The config spec comprises powerful general rules which select a specific configuration of source versions.

view parameters=The parameters that would make thecreation of config-spec possible. This is described in more detail below.

view creation=The 'cleartool mkview' command creates a ClearCase™ view (virtual filesystem) that access the element versions as dictated by the config-spec.

element=An element is a file or directory object instance. All the meta-data like versions, branches, labels, and hyperlinks associated with the element are part of the element and are themselves object instances.

element version=Is a specific revision of an element E.g.: foo.c@@/main/2 is an object which is version/main/2 of element foo.c and it has specific contents that can not be changed.

branch=a sequence of revisions which begins with a specific element version on a parent. A branch provides a mechanism for support forparallel development of a new feature or bug-fix. A branch starts at a specific-version on the parent-branch; after the branch is created, the branch will not be affected by the ongoing development in the parent branch. Periodic syncs are usually performed to merge the changes done on a relevant parent-branch into the current branch. See FIG. 3.

REF_LABEL=The label on the parent-branch that the current branch is synced to. It identifies the parent branch configuration on which the current branch is based.

VOB database=Versioned Object Base. Source data is stored in databases referred to as 'Versioned Object Bases' (VOBs). ClearCase™ source repository. All the source-files (elements) and their versions reside in this repository.

IOS=Internetworking Operating System. The CISCO proprietary operating system used in its switches and routers.

IOS-VOB The ClearCase™ source repositories which house the source files for IOS.

Vob_server=vob_server is a long-lived process which runs on the VOB server host, with the user-ID of the VOB Owner. This process maintains the VOB's storage pools in response to requests from ClearCase™ client processes. (See the vob_server man page in the ClearCase™ Reference Manual)

commit=procedure for submitting source changes to the VOB database using the Cisco proprietary 'commit' script.

meta-data=Various data associated with sources. ClearCase™ supported meta-data-types are labels, attributes, hyper-links, branches. In addition the event-record (what took place, when and who did it) are also part of meta-data.

sync=a way of merging changes done on the parent branch into the current branch.

branch pull=A procedure that creates a new-branch for use.

diff=The differences between two given element versions.

wrapper=a synonym for program or script.

task branch=a branch created by a single user that acts as a container for changes. The changes on task branch are later committed to the integration branch by using the Cisco Systems' 'commit' script.

Integration branch=a branch that acts as a container for parallel changes committed by multiple users, VOB replica=copy of the VOB database. A given VOB can have many replicas. ClearCase™ Multisite software can be used to keep the VOB replicas in sync with one another.

Multisite sync=the process of syncing VOB replicas using ClearCase™ Multisite software.

Figure 3:
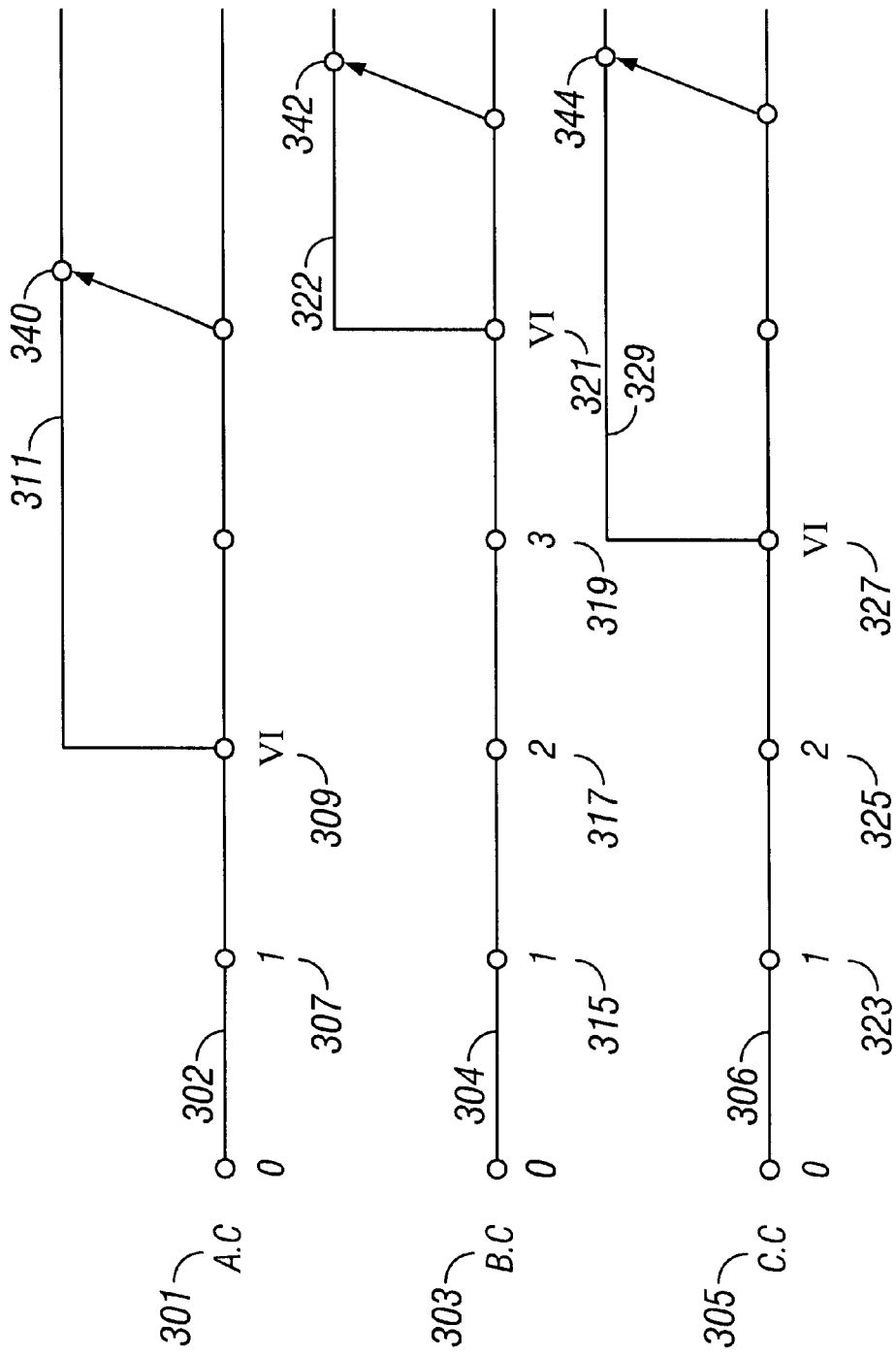
FIG. 3 illustrates a representative diagram of a basic tree structure, which illustrates branches, files and versions of source code files.

Referring now to FIG. 3, some of these basic terms will be illustrated. In FIG. 3 the trees for three source code files A.C 301, B.C 303 and C.C 305 are depicted. The lines 302, 304, and 306 represent Branches and in this case the MAIN Branch of each of the files 301, 303 and 305. The points 307, 315 and 323 on these various main branches represent the point where the first revision of each of the files occurred. At this point in the ClearCase™ system new version objects are added to the VOB database at 307, 315 and 323. Similarly, at points 317 and 319 on the B.C main branch, and at point 325 on the C.C main branch, additional element versions are added as the revisions are committed back to the software configuration management system. Consider now that a development group wishes to have a copy of the files to add some special new capabilities, and consider that the new program would include files A.C, B.C and C.C. A Branch-pull is performed wherein a new branch is created at points "V1" 309, 321 and 327, creating the new branches 311, 322 and 329. These new branches would be given a new Branch Name with a corresponding label type object and the development team could work on these branches while normal (i.e. bug fix, new feature adds, etc.) revisions continue on the main branches. Points 340, 342 and 344 are sync points indicating that the code in the main branches 302, 304 and 306 are synchronized with the code in the branches 311, 322 and 329. Such synchronizations occur periodically to keep the development branches updated with bug fixes etc., made routinely to the main code branches.

The Prior Art Method of Creating and Writing Labels to the VOB

Referring now to FIG. 4 the process of making source changes is generally depicted. The programmer checks out current versions of the source files 401. Then the programmer makes the necessary changes 402 and commits the changes 403.

Referring now to FIG. 5 the prior art process ofcreating a source snapshot is depicted. In FIG. 5 the process starts when SCMgroup gets (pulls) a program (here shown to comprise files A.C, B.C and C.C) 501 from the ClearCase™ scm system. This pull would normally pull the current version of each component file to comprise the program image desiredThe source snapshot is created using1 "mklabel Cisco wrapper". The "mklabel cisco wrapper" creates the new label-type 507, and in the Prior Art, attaches the new label object instances to the new element versions. 509

The Need for this Invention—Virtual-labels?

Physical label instances cause a great deal of multisite activity:

ClearCase™ treats each of the associations of a label instance with a given element version as an individual VOB transaction. Hence when a full-label is laid on about 15000 elements that applicants have in their IOS-vobs, it causes 15000 VOB transactions. The multisite packets of these 15000 VOB transactions sent to all of the 35 replicas that applicants have for IOS-vobs consume significant network and VOB server CPU resources.

Need a lot of hardware and vob-db resources:

ClearCase™ has a hierarchical database to store the meta-data associated with each VOB. This database will have a record for each association of label instance with corresponding element version. Such records stored for all of the elements in the VOB result in extremely large-databases requiring vast amounts of disk-space and RAM (since Rational recommends having a RAM of half the vob-db size). Also there are hardware limitations on the growth of a VOB-database imposed by ClearCase™ and the host OS.

Slow down commits:

The client and the server replicas must be in sync before a commit can happen. If the client created physical label, a large multisite packet is created and the server will be busy importing the large multisite packet. All further commits from the client will have to wait till the server imports the large multisite packet.

THE INVENTION

What is a Virtual-label?

A virtual-label stores just the parameters associated with the ClearCase™ view that is used for creating the label instead of physically associating the label with every element version-pair that belongs to the label. The view parameters are stored as attributes of the label type object in ClearCase™. The most important among the view parameters are:

the name of the branch to which the view belongs the freeze-time of the view

REF_LABEL on the parent of the branch to which the view belongs

Given the above view-parameters, it is possible to construct a config-spec to recreate the view, which was used to lay the label (and hence recreate the label).

How will Virtual-labels Solve the Technical Problem?

Reduced multisite activity:

Since the virtual-labels cause fewer transactions that need to be repeated at multiple remote sites, the multisite traffic is significantly reduced. So instead of 15000 label instance operations, we simply create a few attributes and set them to values "marking" the configuration to which the label would correspond. Using the attribute info, we can reconsturct the same versions of the 15000 elements to which the label would have been attached.

Reduced hardware and vob-db needs:

Owing to the fewer operations, the vob databases do not grow as rapidly and hence will not require more disk space as often. Also, the vob_server is relatively freed-up since it needs to deal with small multisite packets.

Faster commits:
The commit time directly depends on the time taken for the multisiting of the task-branch. Without physical label instances, the overall multisiting activity is greately reduced. Reduced multisite activity results in faster commit times.

Remote replicas are more currentr:
Owing to the reduced multisite activity, the commits of the users will take less time to be multisite-synced to the other replicas.

Less saturation of low bandwidth, wide area networks:
The smaller multisite packets are easier to transport to the remote sites such as Sydney, UK, Israel, India etc. that are connected by relatively low bandwidth, wide area network connections.

DESCRIPTION OF THE PREFERRED EMBODIMENT

The preferred embodiment is now described The invention comprises the modified use of attributes of the label type objects in lieu of using physical label instances with each element version; and the use of these virtual labels to generate a configuration specification (config.-spec) for a desired program source code configuration.

Concerning the first aspect of the invention, use of attributes connected to the label type object, recall the definition of a virtual label:

A virtual-label stores just the parameters associated with the ClearCase™ view that is used for creating, the label instead of physically associating the label instance with every element version- that belongs to the label. The view parameters are stored as attributes of the label type object in ClearCase™. The most important among the view parameters are:

the name of the branch to which the view belongs the freeze-time of the view the REF_LABEL on the branch to which the view belongs The changes in the tools outlined below make it possible to use virtual-labels in almost all the cases where physical-labels are used today The following sections describe the "New label creation process" FIG. 7, the "CSpec Creation process" FIG. 8, the "Branch pull process" FIG. 9, and the "view Creation process" FIG. 6 using the virtual labels as used in the preferred embodiment of the invention. Those skilled in the art will recognize that various other similar methods and variations can be used while maintaining the spirit and essence of the invention.

Figure 7:
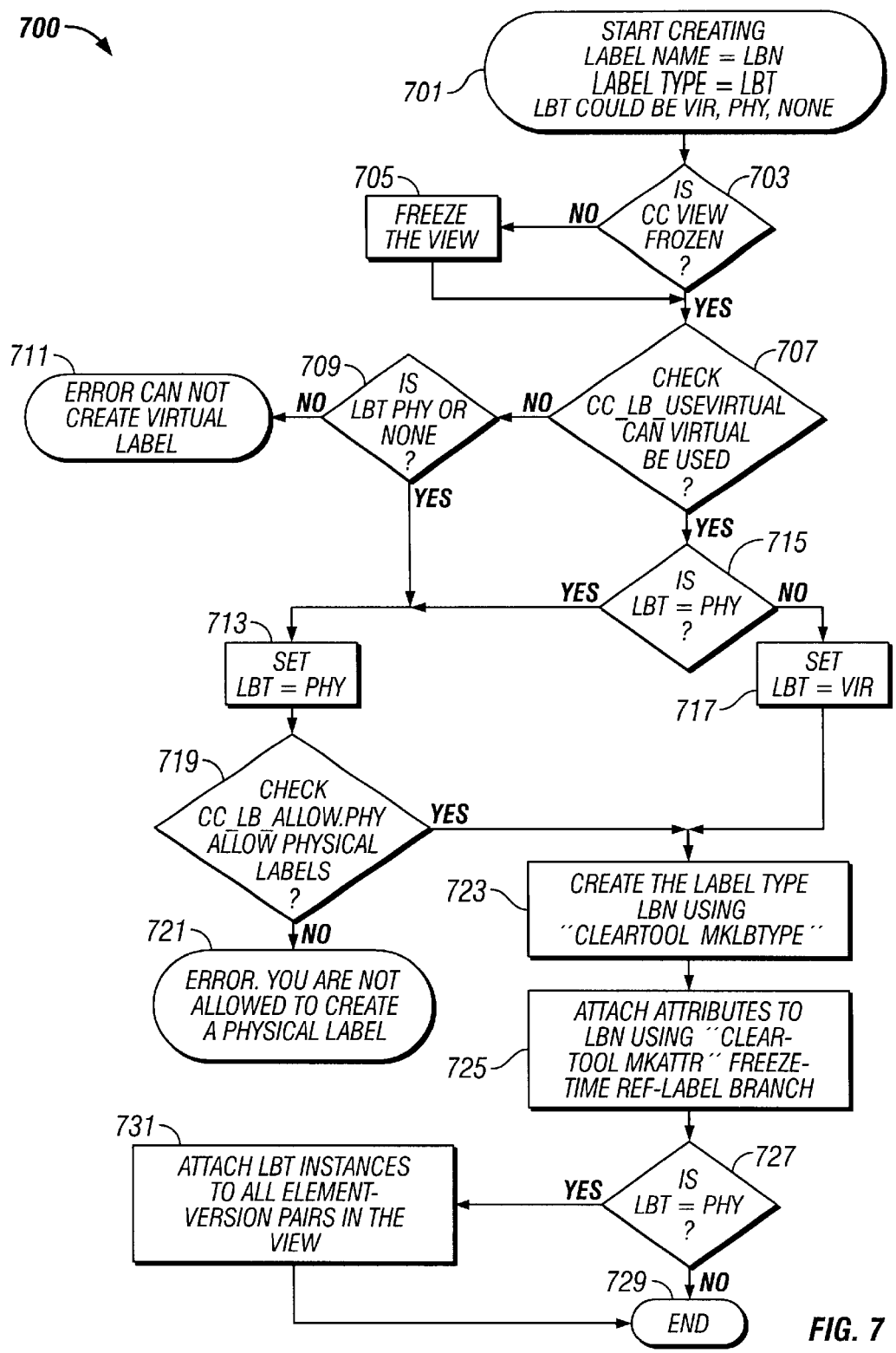
FIG. 7 illustrates a flowchart of the preferred embodiment process for New Label Generation.

Referring now to FIG. 7 the use of virtual labels in the "New label creation process" is described. There are three vob level attributes (placed on the primary vob of a vob group) which form part of the new features of the preferred embodiment. These are described here because two of these new attributes are used in this "New label creation process" described in FIG. 7. These new attributes used in the preferred embodiment are:

1. CC_LB_USEVIRTUAL:
   This attribute would have two possible values
   Disabled (Attribute is not present on the vob)
   Enabled (Attribute is present on the vob with some arbitrary non-null value).
   If this attribute is 'Enabled,' then the 'mklabel' wrapper attempts to create a virtual label, by default. If a physical label is to be created, then an explicit—'physical' option needs to be given to the "mklabel" Cisco wrapper.
   If this attribute is 'Disabled,' then the "mklabel" wrapper would attempt to create a physical label, by default. If a virtual label is to be created, then an explicit—'virtual' option needs to be given to the "mklabel" cisco wrapper.

2. CC_LB_TRAVERSE:
   This attribute would have three possible values
   Disabled (Attribute is not present on the vob)
   Virtual (Attribute has a value of VIR)
   Physical (Attribute has a value of PHY)
   If this attribute is 'Disabled', then the virtual label Cspec generation algorithm would not attempt to expand (traverse) physical labels. For virtual-labels, the Cspec generation method would return an error.
   If this attribute is 'Virtual', then the virtual label Cspec generation algorithm would expand (traverse) virtual-labels, but not physical labels.
   If this attribute is 'Physical', then the virtual label Cspec generation algorithm would expand (traverse) both virtual and physical labels.

3. CC_LB_ALLOWPHYS:
   This attribute would have two possible values
   Disabled (Attribute is not present on the vob)
   Env Variable name (String representing the name of an env variable)
   If this attribute is 'Disabled', then the 'mklabel' wrapper would allow any user to create physical labels.
   If this attribute is set to an 'env variable', then the 'mklabel' wrapper would allow creation of physical labels, only if the specified variable is defined within the environment of the 'mklabel' wrapper.

Note: If none of the above attributes are defined, then the behavior of the wrappers (with respect to virtual/physical labels) should be exactly the same as it was before the use of virtual labels.

Referring now to FIG. 7, a description of the "New label generation process" 700 is described. The label creation process begins by initiating the command "mklabel" indicating the label name=LBN (the name desired) and indicating the label type=LBT where LBT could be VIR (for virtual), PHY (for physical label) or NONE (meaning the type is unspecified). 701 The program first asks whether cc view is frozen 703 (i.e. a static snapshot configuration) and if so, the system proceeds to the next step 707, and if it is not presently frozen, the system freezes this view 705 and notes the freeze time for later use, then proceeding to step 707. Here 707 the first of the VOB level attributes (CC_LB_USEVIRTUAL) is checked to see if virtual labels can be used. If the attribute is disabled, the system checks to see if LBT=PHY or NONE 709. If LBT=VIR the system exits 711 with an error message saying "this attribute which allows one to use a virtual label is disabled but you have specified that you want the label to be virtual." If the LBT was equal to PHY or NONE the system sets LBT=PHY 713 and proceeds to check another of the new VOB level attributes, CC_LB_ALLOWPHYS at step 719 to see if physical labels are allowed. If the attribute is disabled an error message is created indicating that "the user is not allowed to create a physical label." 721 Note that this is used to ensure that most users use the virtual label process in order to achieve the efficiencies defined above. Certain privileged users however must be allowed to use physical labels if they have a need to do so and in their case this attribute CC_LB_ALLOWPHYS is enabled. When that is the case the system allows the label creation process to continue at box 723. However, returning to box 707, if the CC_LB_USEVIRTUAL attribute was enabled, the system checks the contents of LBT again and if LBT=PHY 715 this also proceeds to box 713 as before. If at box 715 LBT is not equal to PHY then the system sets LBT=VIR 717 and proceeds to box 723. The system then creates the label type LBN using the command 'cleartool mklbtype.' 723 Then the attributes FREEZE TIME (set to the time when this view was frozen), REF-LABEL (set to the branch label on the parent branch) and BRANCH (set to the name of the current branch) are attached to LBN using command 'cleartool mkattr.' 725 The system then checks again to see if the label is a physical one or a virtual one. 727 If physical, LBT instances are attached to all element versions in the view 731 and exits 729. If the label is a virtual one at box 727 the system exits 729.

Figure 8:
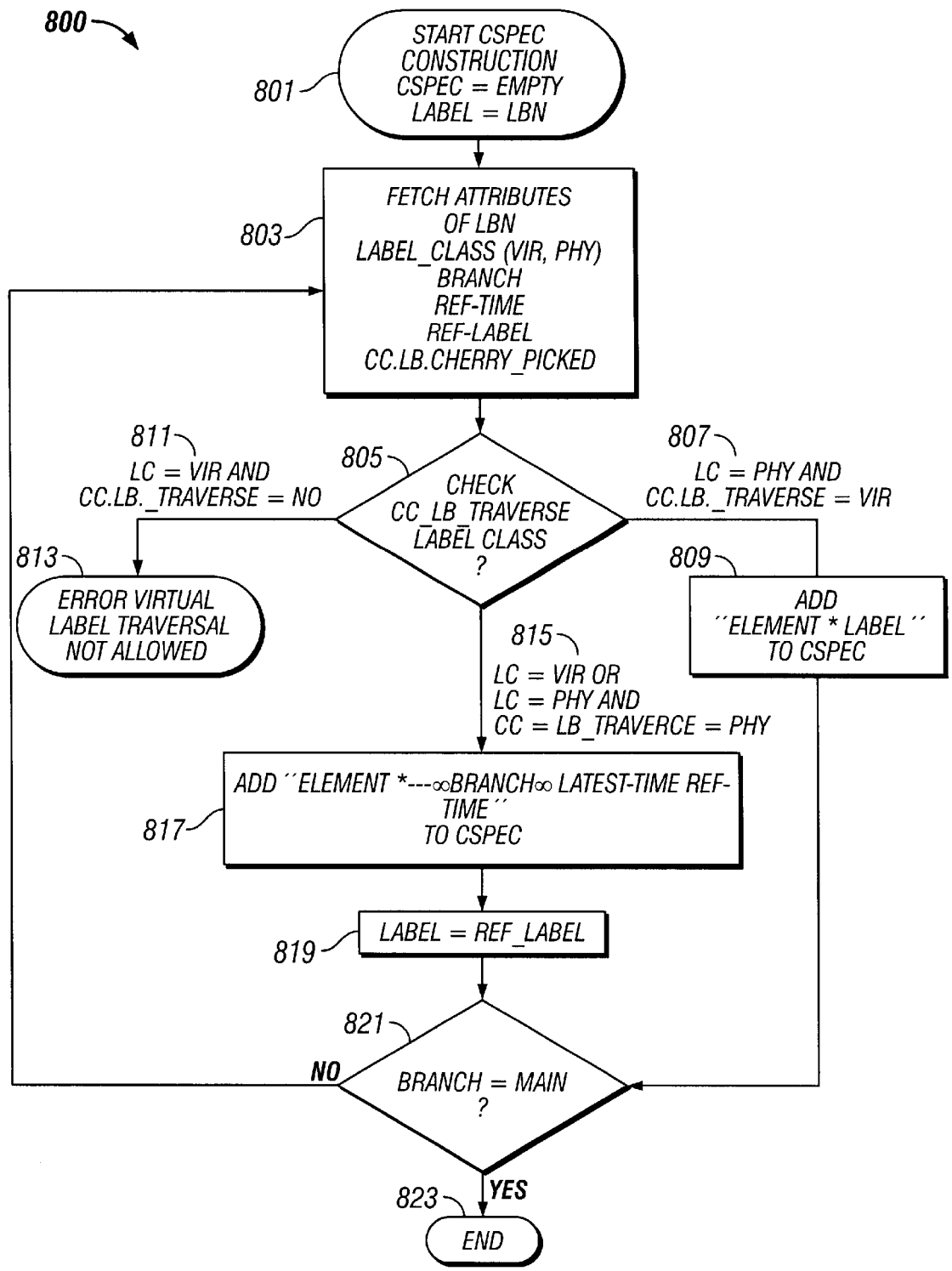
FIG. 8 illustrates a flowchart of the preferred embodiment process for configuration specification generation.

Referring now to FIG. 8, the preferred embodiment for creating a configuration specification (cspec) 800 is described. The call 'CCLABEL::generate_cspec' is executed. Upon beginning the cspec construction 801 the variable 'cspec' is set to 'empty', and label set equal to LBN. Next the attributes of LBN are fetched 803 including label_class (vir, phy)
Branch
REF_TIME
REF_LABEL
CC.LB.CHERRY_PICKED.

The attribute CCLBCHERRY_PICKED allows the user to include into the cspec an element version which has a modification time different from the freezetime. For example, if the user knows that a later version of an element corrects a bug and he/she wants that latest element version in this cspec he can attach the label instance to the element version and mark the label as cherrypicked using this attribute.

Next a check is made of the last of the three VOB level attributes of the present invention, CC_LB_TRAVERSE 805. If the label class LC is virtual (i.e.=vir) and the attribute CC_LB_TRAVERSE is disabled 811, the system will not attempt to expand (traverse) the labels and will return an error message 813 saying "a virtual label traversal is not allowed." If the check of CC_LB_TRAVERSE indicates a value of VIR 807 and label class LC=phy then the system adds 'element*label' to the cspec 809 and exits 823. That is, the cspec generation would expand (traverse) virtual-labels, but not physical labels. If CC_LB_TRAVERSE indicates a value of PHY and LC=VIR or PHY 815 then the system will expand (traverse) both virtual and physical labels. Next the system adds 'element * . . . /Branch/LATEST -time REF_ TIME' 817, sets Label=REF_LABEL 819 and then checks to see if Branch=main 821. If Branch does equal "main" then the generation is completed and the system exits 823. If however, Branch does not equal "main" the cspec generation is not yet completed and the system returns to box 803 to get the next label to be processed.

Figure 9:
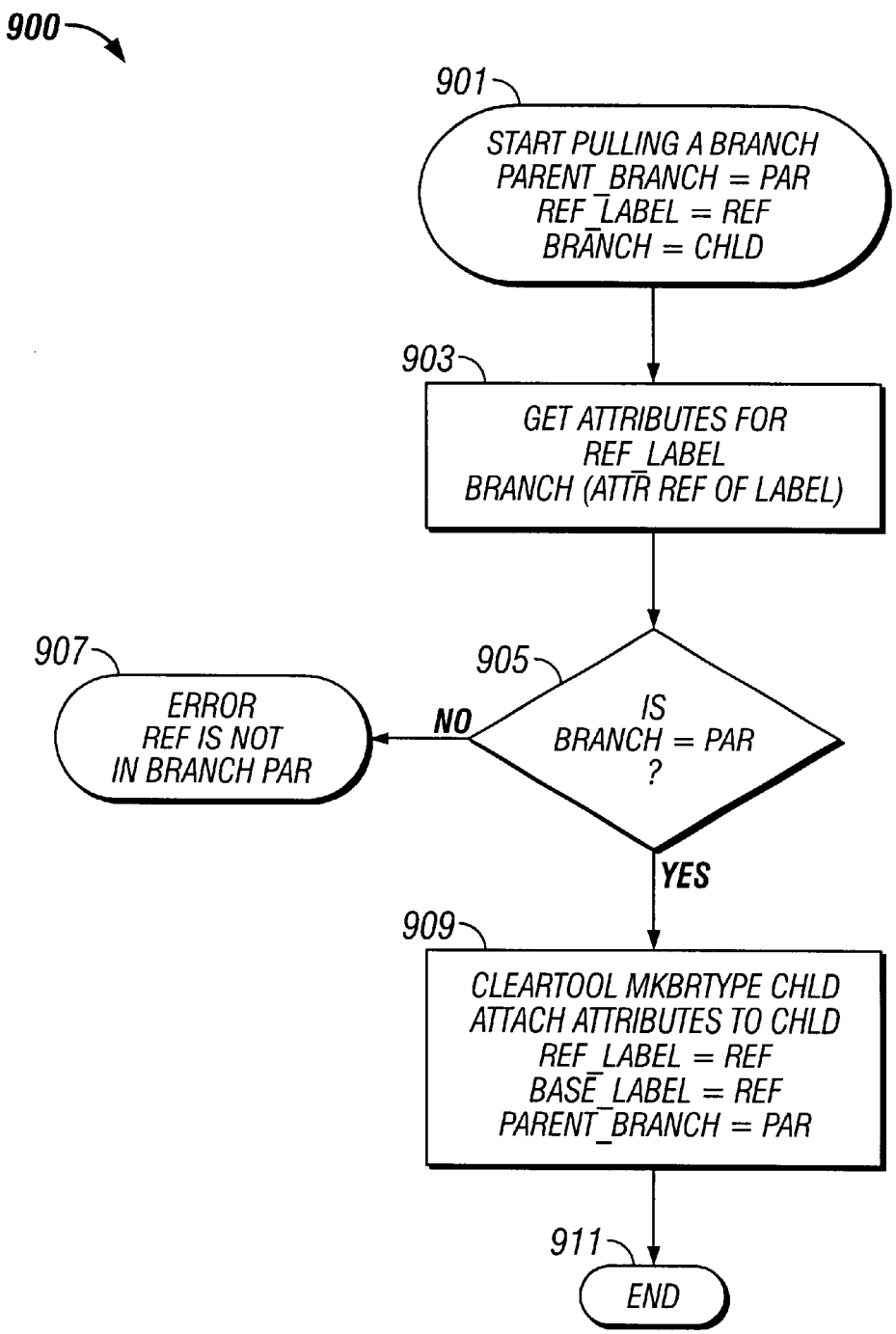
FIG. 9 illustrates a flowchart of the preferred embodiment process for a Branch Pull Process.

Referring now to FIG. 9, the Branch Pull process 900 is described. When the cisco wrapper command 'mkbrtype' is executed the system starts pulling a branch 901 with PARENT_BRANCH=PAR
REF_LABEL=REF, and
BRANCH=CHLD.

The user specifies the Parent Branch, the Parent Ref_ Label indicating at which point the branch is to be pulled, and specifies a name for the pulled Branch (i.e. Branch=new name=CHLD).

Next the system gets the attributes for element versions designated by REF_LABEL point 903 as well as the Branch, and then asks whether Branch=PAR? 905 If not this indicates that the REF_LABEL point is not in the Branch specified 907 and the system exits with an error message. If Branch is equal to PAR then the command 'cleartool mkbrtype CHLD is executed 909 and the values the user supplied initially are used in attaching attributes to CHLD:

REF_LABEL=REF
BASE_LABEL=REF and
PARENT.BRANCH=PAR and
the system exits 911.

Figure 6:
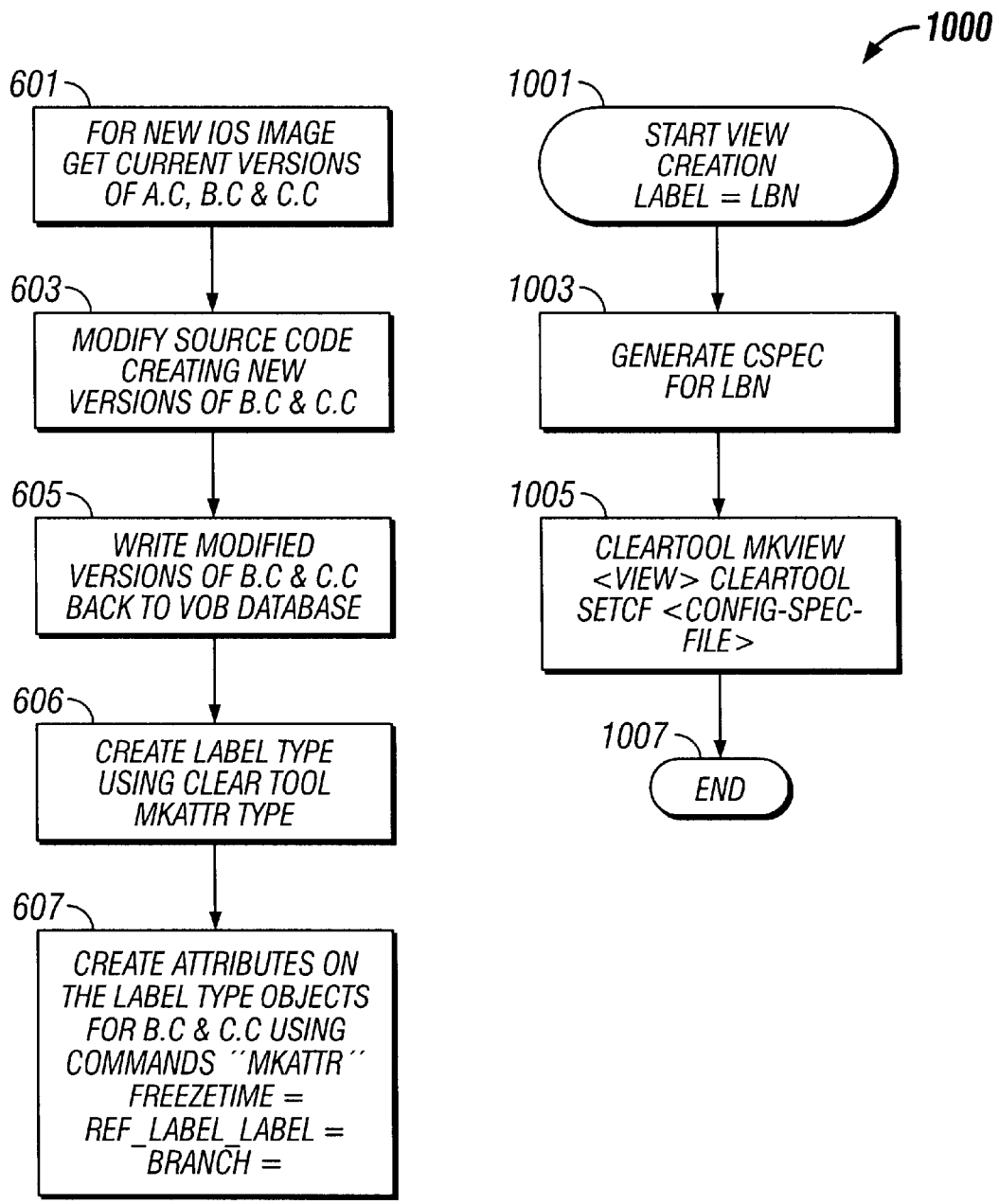
FIG. 6 illustrates a flowchart of the preferred embodiment process for the View Creation Process.

Referring now to FIG. 6, the View Creation Process 1000 in the preferred embodiment is described. The command 'mkview' is executed and the View creation is started with Label set to LBN 1001. Next the system generates a Configuration spec(cspec) for LBN 1003 and stores it in a temporary file, say <config spec file>. Then the following commands are executed 1005:

cleartool mkview<view>
cleartool setcs<config.spec-file>
and the system exits 1007.

AN EXEMPLARY DETAILED DESCRIPTION

This preferred embodiment of the present invention can better be explained with the help of an example. Consider the following branching structure for a software source SCM system.

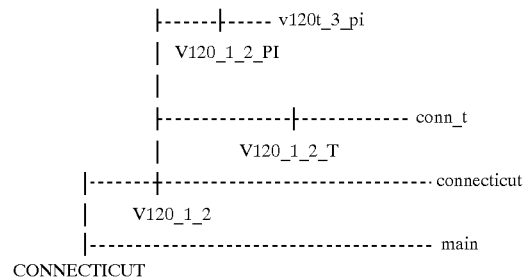

Currently all the above labels are physical. Hence to access the versions belonging to the V120_1_2_PI label, a config-spec of the following form is generated and used:

element* V120_1_2_PI

In the proposed solution, all the above labels will be laid virtual and will have the following attributes associated with them.

| Attribute | V120_1_2 | V120_1_2_T | V120_1_2_PI |
|---|---|---|---|
| BRANCH | connecticut | conn_t | v120t_3_pi |
| REF_LABEL | CONNECTICUT | V120_1_2 | V120_1_2_T |
| Freezetime | <conn_time> | <conn_t_time> | <conn_pi_time> |
| CC_CHERRY_PICKED | FALSE | FALSE | FALSE |

In the above table it should be noted that labels are in upper case letters (such as, CONNECTICUT for example) and branches are in lower case letters (for example, connecticut)

Given the above attribute values, with the preferred embodiment changes, the tools will generate a config-spec of the form:

| | | |
|---|---|---|
| Element | * .../v120t_3_pi/LATEST | -time <conn_pi_time> |
| Element | * .../conn-t/LATEST | -time <conn_t_time> |
| Element | * .../connecticut/LATEST | -time <conn_time> |
| element | * CONNECTICUT | |

A config-spec with the above lines will exactly access the same versions as the config-spec using the physical-label V120_1_2_PI.

Also, to support cherry picking, the attribute CC_CHERRY_PICKED is set to 'TRUE' if a given label has been cherry-picked. When a label is cherry-picked it means that the physical label instance has been placed on a few files (Eg.that are part of a bug-fix which need to be included in the snapshot represented by the label). Assuming the CC_CHERRY_PICKED status of the labels is as follows:

| Attribute | V120_1_2 | V120_1_2_T | V120_1_2_PI |
|---|---|---|---|
| CC_CHERRY_PICKED | FALSE | TRUE | TRUE |

A config-spec of the following form is generated:

| | | |
|---|---|---|
| Element | * V120_1_2_PT | |
| Element | * .../v120t_3_pi/LATEST | -time <conn_pi_time> |
| Element | * V120_1_2_T | |
| Element | * .../conn_t/LATEST | -time <conn_t_time> |
| Element | * .../connecticut/LATEST | -time <conn_time> |
| Element | * CONNECTICUT | |

The internal design of the preferred embodiment is indicated below relative to the code changes needed in each of the tools and the library routines. Those skilled in the art will recognize that different implementations are possible which would result in different changes to these routines without changing the essence of the invention.

cc_label.pm:

In the preferred embodiment this is a new object-library for dealing with the labels and the attributes of the labels. When a partial physical label is encountered, we need to traverse it further (using 'branch . . . - time' rule unless CC_LB_TRAVERSE inhibits it).

| class and object methods | |
|---|---|
| $1b = cc_label->new ($1bname); | # Fill new object with label name. |
| $1b->get_label_attributes(); | # Get attributes for a label. |
| $1b->set_label_attributes(att); | # Modify attributes for a label. Attributes are specified as Name/Value pairs. |
| $cspec = $1b->get_cspec(); | # Get config spec corresponding to the specified label object |
| @lbbrt = $1b->get_branch_times(); | # To return an array of branch/freezetime information. |
| $1b->is__virtual(); | # To determine if a given label is virtual |
| $1b->is_partial (); | # To determine if a given label is partial |
| $ref_label = cc_label->get_ref_label(@cspec); # Parse Tool portion of Cspec | and determine the REF LABEL. |

-continued

| private methods | |
|---|---|
| process_attributes() | # Attribute processing for backward compatibility. |
| set_label_audit_attributes() | # Write label attributes to UFS |
| set_label_cc_attributes() | # Write label attributes to CC |
| get_label_audit_attributes() | # Get label attributes from UFS |
| get_label_cc_attributes() | # Get label attributes from CC |
| validate_label() | # To validate if the label is OK |
| get_parent_details() | # Recursive method to get parent label info |
| is_virtual_allowed() | # Check if virtual-labels are allowed. |
| compress_file() | # To compress a given file (using atria's Gzip) |
| object attributes | |
| LBNAME | # Name of the label |
| BRANCH | # Name of the branch corresponding to the label. |
| LABEL_TYPE | # Partial/Full |
| LABEL_CLASS | # Virtual/Physical |
| REF_TIME | # Freeze time for the view at the time of creating the virtual label |
| REF_EPOCH | # Epoch numbers at the time the label was created. |
| REF_LABEL | # Name of the parent label (if present) |
| REF_OBJ | # Reference to object containing the ref label details (if present). |
| CC_CHERRY_PICKED | # To indicate whether the label has been cherry-picked or not. |
| ERROR | # Error String (if any of the methods failed with error) |

VOB Level Attributes

CC_LB_TRAVERSE—If this attribute is set to 'VIR' while traversing the label-hierarchy, when a physical-label is encountered, the physical-label needs to be used (instead of the—time rule). Also the environment variable CC_LB_TRAVERSE needs to be honored, i.e., when we see this variable setting in the environment, we should use the physical-labels (instead of the—time rule).

cc cspec.pm

A class library is required for managing the config-specs. For consistency, all of the wrappers that need to modify the config-specs need to use this class library and get the config-spec updates only from this library. It is the responsibility of this class library to use the cc_label library and get the virtual-labels expanded before they are used in the config-specs.

mklabel:

This command is modified to create the attributes (specified above in cc_label.pm description) on the label type object. This command also stores the attributes in ufs as a redundancy safeguard.

Initially, the mklabel wrapper would create the CC_CHERRY_PICKED attribute on all the labels. In an alternate embodiment, an additional command or wrapper, say commit_label, could be created to find out if the label was indeed cherry-picked, if so, leave the CC_CHERRY_PICKED attribute; otherwise remove the CC_CHERRY_PICKED attribute. Subsequently, the commit_label wrapper could lock the label type in ClearCase signifying that the label cannot change thereafter.

Only when CC_LB_USEVIRTUAL is set on the vob, then 'mklabel' will by default create the virtual-labels. The '-physical' option will have to be explicitly specified on the 'mklabel' command line if physical labels are desired. If the attribute CC_LB_ALLOWPHYS is set on the vob, then the user should be allowed to create physical labels only if the specified environment variable (typically CC_BUILD_GROUP) is defined.

mkview:

The mkview wrapper need not abort if given a virtual-label or partial-label. It just needs to contact the config-spec class (cc cspec.pm) for getting the proper config-spec for the view. The config-spec class contacts the label class (cc_label.pm) to get the portion of the config-spec corresponding to a given label.

Prepare:

When merging (re-basing) to a label, it needs to create a temporary view accessing the virtual label and use that top view with the 'cleartool findmerge'. For any config-spec manipulations, it needs to contact the cc_cspec class.

cc derived.pl:

The cc_analyze_cspec routine in this library needs to be transferred to cc_cspec class since all the cspec updates are done by the cc_cspec class. Also the cc_analyze_cspec routine needs to call cc_cspec object methods for getting the new-cspec.

cc find:

| | |
|---|---|
| This new tool is used to find the versions of the argument files that belong to the argument label. It should support the following minimum functionality: % cc_find -label <label> -dir [-file <list_file>] [path...] | |
| -label <label> | : The versions that belong to <label> need to be returned. |
| -file <list_file> | : versions of all the pathnames mentioned in <list_file>that belong to <label> need to be returned. |
| [ path... ] | : versions of <path> that belong to the <label> need to be returned. |
| -dir | : With this option the specified directories will NOT be recursed. | updlabel:

This tool displays/modifies the attributes of a label. Initially it just displays the label-attributes. In the future this tool can be used to manipulate the attributes on the label type, to support user-settable label-attributes.

Procedure/Process changes

Any use of the version-extended pathnames that include labels will not work with non-virtual labels. That is, any accesses like foo.c@@/MY_LABEL would fail. One will have to use cisco wrapper 'cc_find' to find out the exact version of a given file that belongs to the label.

If the developers were earlier using version extended paths of the form <file>@@/LABEL, they will first need to run 'cc_find-label LABEL <file>and then use the resulting version extended path.

In using the preferred embodiment of the invention, "Release Management" groups need NOT create physical labels. They will create only virtual-labels.

The branch sync process would change. Instead of merging to a label, using

% cleartool findmerge -fversion LABEL the sync engineers would need to do the following:

% mkview -i LABEL # creates a view called <user>-<LABEL>% cleartool findmerge -ftag <user>-<LABEL>

Having described the invention in terms of a preferred embodiment, it will be recognized by those skilled in the art that various types of general-purpose computer hardware may be substituted for the configuration described above to achieve an equivalent result. Similarly, it will be appreciated that arithmetic logic circuits are configured to perform each required means in the claims for creating and using the virtual labels. It will be apparent to those skilled in the art that modifications and variations of the preferred embodiment are possible, which fall within the true spirit and scope of the invention as measured by the following claims.

What is claimed is:

1. A computer source code version control apparatus comprising:

a computer system having a processor, a memory, a program in the memory, a display screen and an input/output unit; and a middleware mechanism residing in the computer system and configured to use a virtual label which comprises instances of a label type object and attributes associated with the label type object which can be used to identify a version object which is related to the label type object, the version object being located in a configuration management system;

wherein the associated attributes include, a value representing a time of a last change on a branch with which an instance is associated, wherein the branch is associated with at least a portion of a specific version of source code from which the branch is derived and represents a sequence of revisions to the portion;

wherein the instance is associated with a plurality of versions of the portion of the source code.

2. The apparatus of claim 1 wherein the middleware mechanism is coupled to a Rational™ ClearCase™ configuration management system.

3. The apparatus of claim 1 wherein the attributes associated with the instances of the label type object further comprise;

a label associated with the version of the source code from which the branch is derived; and an identifier of the branch.

4. The apparatus of claim 1 wherein the middleware mechanism further comprises logic mechanisms to generate and store virtual labels.

5. The apparatus of claim 1 wherein the middleware mechanism further comprises logic mechanisms to create configuration specifications using virtual labels.

6. The apparatus of claim 1 wherein the middleware mechanism further comprises logic mechanisms to generate branch pulls using virtual labels.

7. The apparatus of claim 1 wherein the attributes comprise view parameters and wherein the middleware mechanism further comprises logic mechanisms to create views using virtual labels.

8. A method for using virtual labels in a software configuration management system having databases of source code whereby resources of memory and communications bandwidth are reduced by virtue of using the virtual labels instead of physical labels, wherein the virtual labels comprise instances label type object, the method comprising the steps of:

creating a label type object when it is desired to put a label on versions of source code elements; and storing view parameters as attributes of the label type object;

wherein the attributes of the label type object include, a value representing a time of a last change on a branch with which an instance of the label type object is associated, wherein the branch is associated with at least a portion of a specific version of source code from which the branch is derived and represents a sequence of revisions to the portion;

wherein the instance is associated with a plurality of versions of the portion of the source code.

9. The method of claim 8 wherein the view parameters further comprise:
   a label associated with the version of the source code from which the branch is derived; and
   an identifier of the branch.

10. The method in claim 9 comprising the additional step of using the virtual labels to create configuration specifications.

11. The method in claim 9 comprising the additional step of using the virtual labels to generate branch pulls.

12. The method in claim 9, wherein the attributes comprise view parameters and the method comprises the additional step of using the virtual labels to create a view.

13. The method of claim 9 wherein the virtual labels are used in conjunction with a Rational™ ClearCase™ Software Configuration Management system.

14. A computer program product embodied on a computer readable medium for using virtual labels in a software configuration management system having large databases of source code whereby resources of memory and communications bandwidth are reduced by virtue of using the virtual labels instead of physical labels, wherein the virtual labels comprise instances of a label type object, comprising:
   a. a logic component configured to create a label type object when it is desired to put a label on versions of source code elements; and
   b. a logic component configured to store view parameters as attributes of the label type object, wherein the view parameters comprise:
      a value representing a time of a last change on a branch with which an instance of the label type object is associated, wherein the branch is associated with at least a portion of a specific version of the source code from which the branch is derived and represents a sequence of revisions to the portion;
   wherein the instance is associated with a plurality of versions of the portion of the source code.

15. The computer program product of claim 14 further comprising a logic component for using the virtual labels to create configuration specifications.

16. The computer program product of claim 14 further comprising a logic component for using the virtual labels to generate a branch pull.

17. The computer program product of claim 14, wherein the attributes comprise view parameters and further comprising a logic component for using the virtual labels to create a view.

18. A computer program product embodied on a computer readable carrier wave for using virtual labels in a software configuration management system having databases of source code whereby resources of memory and communications bandwidth are reduced by virtue of using the virtual labels instead of physical labels, wherein the virtual labels comprise instances of a label type object, comprising:
   a logic component configured to create a label type object when it is desired to put a label on versions of source code elements; and
   a logic component configured to store as attributes of the label type object,
      a value representing a time of a last change on a branch with which an instance of the label type object is associated, wherein the branch is associated with at least a portion of a specific version of the source code from which the branch is derived and represents a sequence of revisions to the portion; and
   wherein the instance is associated with a plurality of versions of the portion of the source code.

19. The computer program product of claim 18 further comprising a logic component for using the virtual labels to create configuration specifications.

20. The computer program product of claim 18 further comprising a logic component for using the virtual labels to generate a branch pull.

21. The computer program product of claim 18 further comprising a logic component for using the virtual labels to create a view.

22. A computer program product for using virtual labels in a software configuration management system having databases of source code whereby resources of memory and communications bandwidth are reduced by virtue of using the virtual labels instead of physical labels, wherein the virtual labels comprise instances of a label type object, comprising:
   a logic component configured to create a label type object when it is desired to put a label on versions of source code elements; and
   a logic component configured to store view parameters as attributes of the label type object, wherein the view parameters comprise:
      a value representing a time of a last change on a branch with which an instance of the label type object is associated, wherein the branch is associated with at least a portion of a specific version of the source code from which the branch is derived and represents a sequence of revisions to the portion;
   wherein the instance is associated with a plurality of versions of the portion of the source code.

23. The computer program product of claim 22 further comprising a logic component for using the virtual labels to create configuration specifications.

24. The computer program product of claim 22 further comprising a logic component for using the virtual labels to generate a branch pull.

25. The computer program product of claim 22 further comprising a logic component for using the virtual labels to create a view.

26. A system for using virtual labels in a software configuration management system having databases of source code whereby resources of memory and communications bandwidth are reduced by virtue of using the virtual labels instead of physical labels, wherein the virtual labels comprise instances of a label type object, the system comprising:
   means for creating a label type object when it is desired to put a label on versions of source code elements; and
   means for storing view parameters as attributes of the label type object;
   wherein the attributes of the label type object include,
      a value representing a time of a last change on a branch with which an instance of the label type object is associated, wherein the branch is associated with at least a portion of a specific version of source code from which the branch is derived and represents a sequence of revisions to the portion;
   wherein the instance is associated with a plurality of versions of the portion of the source code.

27. The system of claim 26 wherein the view parameters further comprise:
   a label associated with the version of the source code from which the branch is derived; and
   an identifier of the branch.

28. The system of claim 27 comprising means for using the virtual labels in conjunction with a Rational™ ClearCase™ Software Configuration Management system.

29. The system of claim 27 comprising means for using the virtual labels to create configuration specifications.

30. The system of claim 27 comprising means for using the virtual labels to generate branch pulls.

31. The system of claim 27, wherein the attributes comprise view parameters and the system comprises means for using the virtual labels to create a view.

* * * * *

UNITED STATES PATENT AND TRADEMARK OFFICE
CERTIFICATE OF CORRECTION

PATENT NO. : 6,681,382 B1
DATED : January 20, 2004
INVENTOR(S) : Badari N. Kakumani et al.

It is certified that error appears in the above-identified patent and that said Letters Patent is hereby corrected as shown below:

Column 16,
Line 58, "instances label type" should read -- instances of a label type --.

Signed and Sealed this

Eleventh Day of May, 2004

JON W. DUDAS
*Acting Director of the United States Patent and Trademark Office*